2,782,522

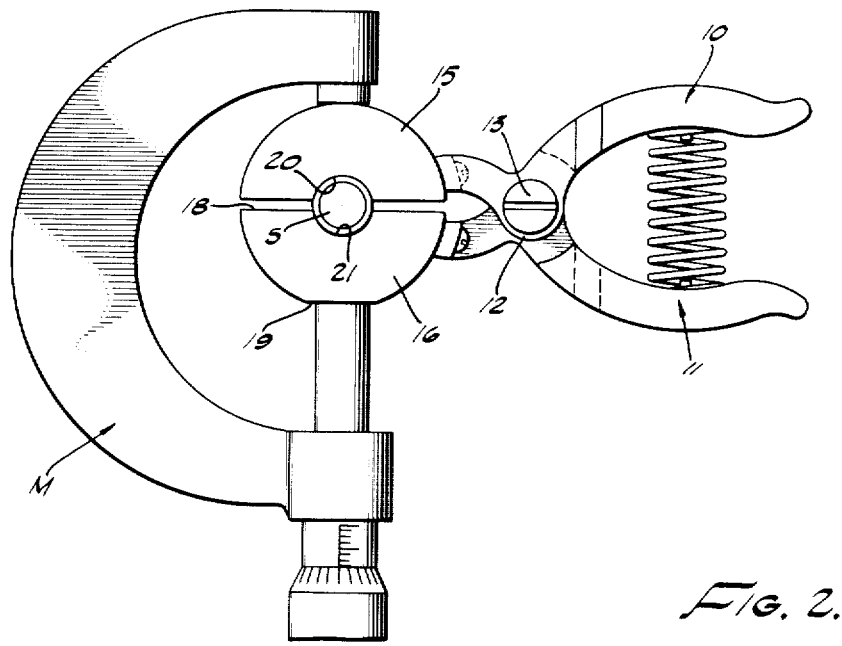
Fig. 1.
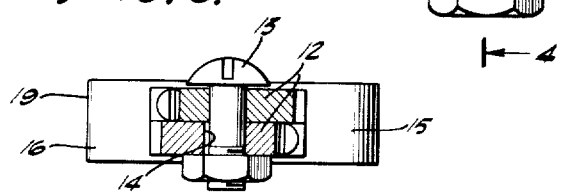
Fig. 2.
Fig. 3.
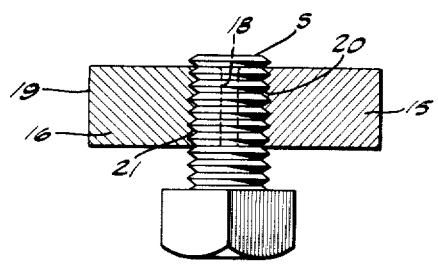
Fig. 4.
ROBERT H. BLACK
INVENTOR.
BY Hazard & Miller
ATTORNEYS

United States Patent Office
2,782,522
Patented Feb. 26, 1957

THREAD GAUGE

Robert H. Black, Los Angeles, Calif.

Application September 14, 1953, Serial No. 379,894

2 Claims. (Cl. 33—199)

This invention relates to improvements in thread gauges.

A primary object of the invention is to provide an improved form of thread gauge which is so designed that it may be easily and quickly applied to a threaded article or test piece, such as a bolt, stud, or the like, and an accurate determination may be easily and quickly obtained as to whether the threaded article or test piece has threads of the proper pitch diameter and the proper lead, and whether substantially the entire length of the thread engaged by the thread gauge is uniform or meets the requirements of the thread gauge.

Heretofore, thread gauges have been provided consisting of two opposed jaws or blocks having serrations formed thereon complementary to the thread of a perfect test specimen. Such jaws or blocks when applied to the test specimen have been applied in a manner tangent thereto. Such jaws or blocks are capable of measuring the pitch diameter of the test specimen and in some instances can detect lead error. However, the measurement made therewith occurs only at the points of tangency or points of engagement between the jaws or blocks and the test specimen. If the test specimen has its threads galled or misshapen at locations other than the tangent points of engagement, such imperfections that are present on the test specimen are not detected nor in any way indicated by the thread gauge.

It is therefore a further object of the invention to provide a thread gauge which, instead of having serrations thereon, that will engage the test specimen only at points of tangency, will have thread segments which will engage the test specimen about the major portion of its entire circumference. Consequently, if the threads on the test specimen are perfectly formed at one locality but are imperfectly formed at other localities this will be detected by the thread gauge.

Another object of the invention is to provide a thread gauge wherein the jaws or blocks having the thread segments are so designed as to facilitate an accurate measurement thereacross when applied to the test specimen by means of a conventional micrometer.

With the foregoing and other objects in view, which will be made manifest in the following detailed description and specifically pointed out in the appended claims, reference is had to the accompanying drawings for an illustrative embodiment of the invention, wherein:

Figure 1 is a top plan view of a thread gauge embodying the present invention illustrating the thread gauge in applied position about a test specimen and the manner in which measurement is effected;

Fig. 2 is a view in side elevation of the thread gauge shown in Fig. 1;

Fig. 3 is a vertical section taken substantially upon the line 3—3 upon Fig. 2; and Fig. 4 is a vertical section taken substantially upon the line 4—4 upon Fig. 2.

Referring to the accompanying drawings wherein similar reference characters designate similar parts throughout, the improved thread gauge consists of two opposed handle members 10 and 11 having overlapping ears 12 through which a pivot bolt 13 extends. This pivot bolt is preferably a loose bolt, clearance being shown at 14, and is longer than necessary to hold the handle members together so that some working of the handle members laterally relatively to each other and in a direction parallel to the axis of the bolt 13 is permissible. The forward ends of the handle members have substantially semi-cylindrical blocks or jaws 15 and 16 rigidly secured thereto. A compression spring 17 is compressed between the handles 10 and 11 so as to urge the blocks or jaws 15 and 16 into clamping engagement upon a test specimen or bolt S.

The blocks or jaws 15 and 16 are initially formed of a single flat cylindrical disc in which a hole is drilled and tapped with a precision tap which will cut threads in the block complementary to a perfect test specimen. Preferably, the tap is chased through the block three times. Thereafter, the cylindrical block is cut on a diameter as indicated at 18 and the parts of the block thus divided into semi-cylindrical blocks may be hardened. Prior to the hardening a flat 19 may be rough-ground on the back of the semi-cylindrical block 16 and subsequent to the hardening the thread segments 20 and 21 on the opposed faces of the blocks may be lapped so that these threaded segments will be precisely complementary to the threads of a perfect thread specimen S. The flat 19 is arranged substantially parallel to the opposed faces between the blocks 15 and 16. The flat 19 may also be finish-ground so that when the blocks are in clamping engagement with the perfect specimen S the distance from the flat 19 to the back of the block 15 will be some specified unit. Thus, in the case of thread gauges for use on bolts running from 3/16" in diameter to 3/8" in diameter the distance from the flat 19 to the back of the block 15 may measure exactly 1" when applied to a perfect specimen S. In larger sizes the distance from the flat 19 to the back of the block 15 may measure exactly 1½" or 2" when the blocks are applied to a perfect specimen.

In using the thread gauge the handles 10 and 11 are merely squeezed together compressing the compression spring 17 and opening the jaws or blocks 15 and 16 sufficiently to permit the insertion of the specimen S. The handles are then released so that the compression spring 17 is effective to cause the blocks to clamp on the specimen S. The loose play about the bolt 13 enables the blocks to adjust themselves so that they will have their thread segments 20 and 21 properly enter the threads on the specimen. As will be noted from an inspection of Fig. 1, the engagement between the thread segments 20 and 21 on the blocks practically encircles the entire specimen. With the thread gauge in applied position, a micrometer M which may be of conventional construction, is applied over the outer sides of the blocks and is adjusted across the flat 19 so as to measure accurately the maximum distance between the flat 19 and the back of the block 15. This measurement is indicative of whether the specimen S conforms throughout its threads to a perfect specimen. Thus, if the specimen S has an excessive pitch diameter or it has an error in lead or portions of the threads are galled or misshapen these imperfections will prevent closing of the blocks on the specimen S and an excessive measurement will be obtained on the micrometer.

It will be appreciated that the above measurements taken directly across the backs of the blocks is a direct measurement and is not a multiplied measurement which would tend to multiply any error or imperfection on the specimen. Furthermore, the design of the gauge is such that duplicate gauges may be easily and accurately manufactured in that the finish-grinding of the flat 19 may be performed just prior to the completion of the gauge so that the distance measured by the micrometer may accurately conform to some well established and easily recognized distance. It will be appreciated that if desired, gauges may be made up in accordance with the present invention at the two extremes of tolerances permitted so that by applying a go and no-go gauge of the same design and applying the micrometer thereto the specimen can be readily investigated to determine whether it falls within tolerances permitted.

Various changes may be made in the details of construction without departing from the spirit and scope of the invention as defined by the appended claims.

I claim:

1. A thread gauge comprising two opposed semi-circular blocks, means connecting said blocks urging said blocks into clamping engagement with a threaded member to be tested, said blocks having in their mutually opposed faces approximately semi-cylindrical recesses in the walls of which approximately semi-circular thread segments are formed, the outer side of one block being semi-circularly shaped and the outer side of the other block having a flat formed thereon whereby a micrometer may measure the distance between the flat and the outer side of the first-mentioned block to determine the size of thread.

2. A thread gauge comprising two opposed semi-circular blocks, means connecting said blocks urging said blocks into clamping engagement with a threaded member to be tested, said blocks having in their mutually opposed faces approximately semi-cylindrical recesses in the walls of which approximately semi-circular thread segments are formed, the outer side of one block being semi-circularly shaped and the outer side of the other block having a flat formed thereon whereby a micrometer may measure the distance between the flat and the outer side of the first-mentioned block to determine the size of the thread, the flat being substantially parallel to the opposed faces between the blocks.

References Cited in the file of this patent
UNITED STATES PATENTS

| | | |
|---|---|---|
| 1,337,018 | Lockey et al. | Apr. 13, 1920 |
| 2,399,624 | Bunch | May 7, 1946 |
| 2,433,516 | Johnson | Dec. 30, 1947 |

FOREIGN PATENTS

| | | |
|---|---|---|
| 102,573 | Great Britain | Dec. 14, 1916 |
| 49,164 | Sweden | May 11, 1921 |
| 369,917 | Germany | Feb. 24, 1923 |